(12) United States Patent
Wehrli et al.

(10) Patent No.: US 11,080,373 B1
(45) Date of Patent: *Aug. 3, 2021

(54) CYCLICALLY DEPENDENT CHECKS FOR SOFTWARE TAMPER-PROOFING

(71) Applicant: Snap Inc., Santa Monica, CA (US)

(72) Inventors: Johan Wehrli, Bussigny (CH); Julien Rinaldini, Lausanne (CH)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,631

(22) Filed: Oct. 15, 2019

Related U.S. Application Data

(63) Continuation of application No. 15/680,852, filed on Aug. 18, 2017, now Pat. No. 10,467,390.

(60) Provisional application No. 62/376,416, filed on Aug. 18, 2016.

(51) Int. Cl.
| | |
|---|---|
| *H04L 29/06* | (2006.01) |
| *G06F 21/14* | (2013.01) |
| *G06F 8/41* | (2018.01) |
| *G06F 8/51* | (2018.01) |

(52) U.S. Cl.
CPC .............. *G06F 21/14* (2013.01); *G06F 8/443* (2013.01); *G06F 8/51* (2013.01)

(58) Field of Classification Search
CPC ............. G06F 21/14; G06F 8/443; G06F 8/51
See application file for complete search history.

(56) References Cited

U.S. PATENT DOCUMENTS

| | | | | |
|---|---|---|---|---|
| 5,428,786 | A * | 6/1995 | Sites | ............... G06F 8/52 717/151 |
| 7,467,272 | B2 * | 12/2008 | Genty | ............... G06F 12/1466 711/163 |
| 10,467,390 | B1 | 11/2019 | Wehrli et al. | |
| 2003/0208665 | A1 | 11/2003 | Peir et al. | |
| 2005/0183072 | A1 | 8/2005 | Horning et al. | |
| 2009/0254821 | A1 | 10/2009 | Cates | |
| 2011/0055808 | A1 * | 3/2011 | Kielstra | ............... G06F 8/443 717/108 |
| 2012/0036134 | A1 | 2/2012 | Malakhov | |

(Continued)

FOREIGN PATENT DOCUMENTS

WO     WO-2018138212 A1     8/2018

OTHER PUBLICATIONS

Huang, Shih-Kun, et al. "Software crash analysis for automatic exploit generation on binary programs." IEEE Transactions on Reliability 63.1 (2014): 270-289. (Year: 2014).*

(Continued)

*Primary Examiner* — Shawnchoy Rahman
(74) *Attorney, Agent, or Firm* — Schwegman Lundberg & Woessner, P.A.

(57) ABSTRACT

Embodiments of the present disclosure relate to anti-tamper computer systems, in particular to methods and systems which can embed protection code into software. Among other things, the protection code helps prevent (and make it more costly) to reverse engineer to tamper with the protected software with malicious intent, such as, but not restricted to: the removal of a license protection mechanism; the removal of code displaying advertisements; the injection of a malicious thread into the program memory space; illicit usage; or any other kind of unauthorized modification of the software.

20 Claims, 5 Drawing Sheets

(56) References Cited

U.S. PATENT DOCUMENTS

| | | |
|---|---|---|
| 2014/0165208 A1 | 6/2014 | Chevallier-mames et al. |
| 2015/0310193 A1 | 10/2015 | Hoogerbrugge et al. |
| 2016/0062947 A1 | 3/2016 | Chetlur et al. |
| 2017/0364332 A1 | 12/2017 | Lowell |

OTHER PUBLICATIONS

"U.S. Appl. No. 15/680,852, Notice of Allowance dated Feb. 13, 2019", 10 pgs.

"U.S. Appl. No. 15/680,852, Notice of Allowance dated Jul. 8, 2019", 10 pgs.

Larus, James R., et al., "Rewriting Executable Files to Measure Program Behavior", Software Practice and Experience, 24(2), (1994), 22 pgs.

\* cited by examiner

CYCLICALLY DEPENDENT CHECKS FOR SOFTWARE TAMPER-PROOFING

PRIORITY

This patent application is a continuation of and claims the benefit of priority of U.S. patent application Ser. No. 15/680,852, filed Aug. 18, 2017, which claims the benefit of priority to U.S. Provisional Patent Application Ser. No. 62/376,416, filed on Aug. 18, 2016, which are hereby incorporated by reference herein in their entirety

BACKGROUND

Embodiments of the present disclosure relate to anti-tamper computer systems, in particular to methods and systems which can embed protection code into software. Among other things, the protection code helps prevent (and make it more costly) to reverse engineer to tamper with the protected software with malicious intent, such as, but not restricted to: the removal of a license protection mechanism; the removal of code displaying advertisements; the injection of a malicious thread into the program memory space; illicit usage; or any other kind of unauthorized modification of the software.

Some conventional anti-tamper methods include: white-box cryptography techniques; self-checking anti-tamper software; software checks cooperating with a remote server with the purpose of downloading on-demand encrypted and/or authenticated code; software cooperating with a remote server whose goal is to remotely check randomly located or predefined portions of code and/or data; software relying on trusted hardware for ensuring its integrity; etc.

A vast majority of deployed software, notably in embedded systems, cannot rely on a synchronized, bidirectional and permanent communication link with a remote server and/or trusted hardware. Prominent such examples include for instance industrial systems, computers used in the automotive industry, or small computers able to communicate through an ad-hoc network, but without any access to the Internet. Other scenarios include the possibility that such a synchronized and bidirectional communication link with a remote server is too costly in terms of bandwidth and/or energy consumption and/or computational capabilities.

Consequently, one challenge with software tamper-proofing methods that cannot leverage on a continuous bidirectional communication link with a remote server, or on trusted hardware, is to design a method that can withstand the efforts of a reverse engineer as much as possible while requiring only modest computational and memory needs.

Embedding checks into software to be protected, those checks verifying portions of code and data showing dependencies that can be modeled by a Directed Acyclic Graph (DAG), can often be defeated, or made ineffective, as soon as a single check whose location is not covered by at least another check has been identified in the protected software by the reverse engineer. A Directed Acyclic Graph (DAG) is a special kind of graph whose directed edges do not result in any directed loop or cycle. An example of self-checking code whose dependencies can be modeled by a DAG is illustrated in FIG. 2, and the resulting graph is illustrated in FIG. 3. An example of self-checking code whose dependencies form a cycle is illustrated in FIG. 4, and the resulting graph is illustrated in FIG. 5.

The check routines, once their locations have been identified in the protected software, can be themselves modified such that they return always a valid result, even in the case where the software to be protected has been tampered. Some attacks may include identifying check routine locations and replacing, partially or completely, their machine code with inoperative machine instructions, such as a sequence of NOPs (NOP being an abbreviated form of the "No OPeration" machine instruction) on the Intel x86 architecture.

Embodiments of the present disclosure address these and other issues. In some embodiments, the system analyzes dependencies of the checks to form a Directed Graph that explicitly embeds at least one cycle. Result values delivered by the check routines may be used to dynamically compute the starting address of the next sequential block of machine code to be executed at run-time.

The first property helps to ensure that there is no single check routine whose location is not checked itself by at least one other check routine. Hence, a reverse engineer would have to remove all the checks at the same time. The second property helps ensure that, even in the case where all the checks have been removed at the same time, some information, such as the values returned by the checks, will be missing at run-time in order to execute the software as expected by its developers.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 7:
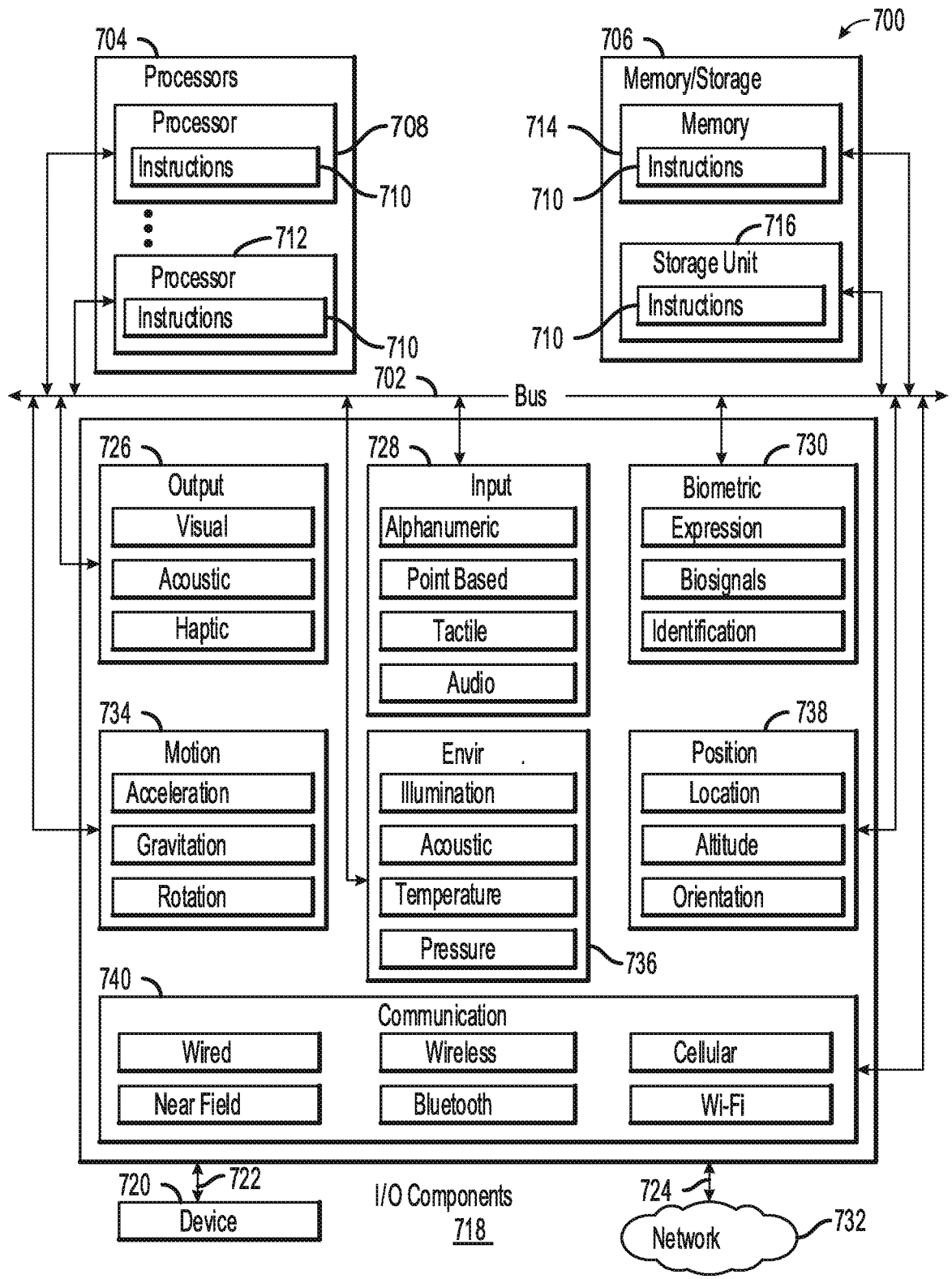
FIG. 7 is a block diagram illustrating components of a machine, according to some embodiments, able to read instructions from a machine-readable medium (e.g., a machine-readable storage medium) and perform any of the processes discussed herein.

Software is a sequence of machine instructions executed on a computer by a Central Processing Unit (CPU), such as processors 704 in FIG. 7. Such machine instructions can consist of arithmetic or Boolean operations applied on the content of CPU internal registers and/or on the content of memory cells located in the Random Access Memory (RAM), such as memory 706 in FIG. 7, and that are unable to modify the program's control flow, i.e., to select or modify the location of the next machine instruction to be executed by the CPU. Machine instructions can also consist of control-flow-modifying instructions, that typically allow the developer to implement conditional expressions, such as IF-THEN-ELSE constructs; loops, such as WHILE-DO, DO-WHILE and FOR constructs; subroutines, such as CALL or RET constructs; exceptions, such as THROW and CATCH constructs; etc. As a consequence of these two different classes of machine instruction, it is possible to interpret software as a collection of Basic Blocks (BB) linked together.

Figure 1:
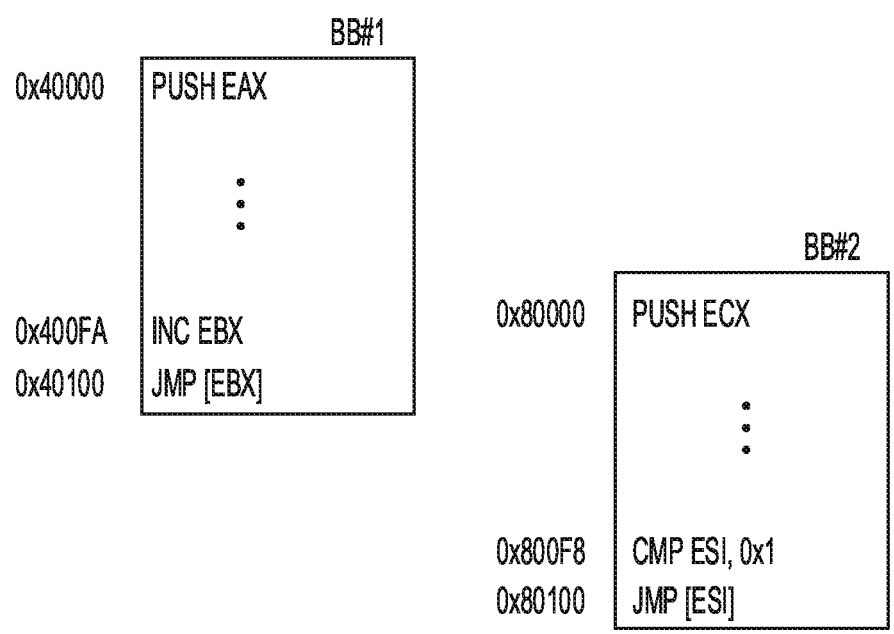
FIG. 1 illustrates two basic blocks of software.

As illustrated in FIG. 1, a basic block is a sequence of machine instructions consisting solely of instructions unable to modify the program control-flow, terminated by a single machine instruction whose goal is to modify the program control flow. Therefore, if the next basic block to be executed depends on previous computations, one of the goals of the computations within a basic block is to dynamically compute the logical address of the next basic block to be executed by the CPU.

The task of computing these logical addresses in such a way that the program control flow reflects the software developer intents is usually devoted to the compiler and to the linker, two tools executed at build time by the software developer and responsible to translate the program as written by the software developer, typically in a well-known programming language such as C, C++, Objective-C, Fortran or Ada, in a binary file, often called an executable, that can easily be parsed by the operating system and directly executed on the host CPU.

For example, a compiler takes as input the program written by the software developer in a specific programming language and it is responsible to parse the program, to analyze its syntactical and semantic correctness, to optimize it as much as possible, and to generate machine code for the target CPU.

We note that the software developer might have structured his program in several distinct syntactic units, also well known in the art as compilation units, most notably when the program has a certain size. The program (or software) is being formed by a plurality of compilation units, each comprising a plurality of basic blocks. Each basic block being located at a starting address within the software. Bringing such structure in a program is widely believed to improve its correctness and maintainability. In consequence, it is the duty of the linker to link all those compiled pieces together, known as object files, to resolve potential dependencies, to embed required system libraries and to build the final executable binary file in such a way that it can easily be parsed by the operating system and directly executed on the target CPU.

Embodiments of the present disclosure help to prevent malicious modification or tampering. Some embodiments may operate at different levels/stages of the compilation and linking process, as described below.

The first stage happens right after the moment where the compiler has parsed and verified the syntactic and semantic correctness of the program written by the software developer in a dedicated programming language. At that moment, the program can be abstractly understood as being in the form of a set of basic blocks and a set of implicit of explicit links between those basic blocks, those links defining the program control flow.

Figure 6:
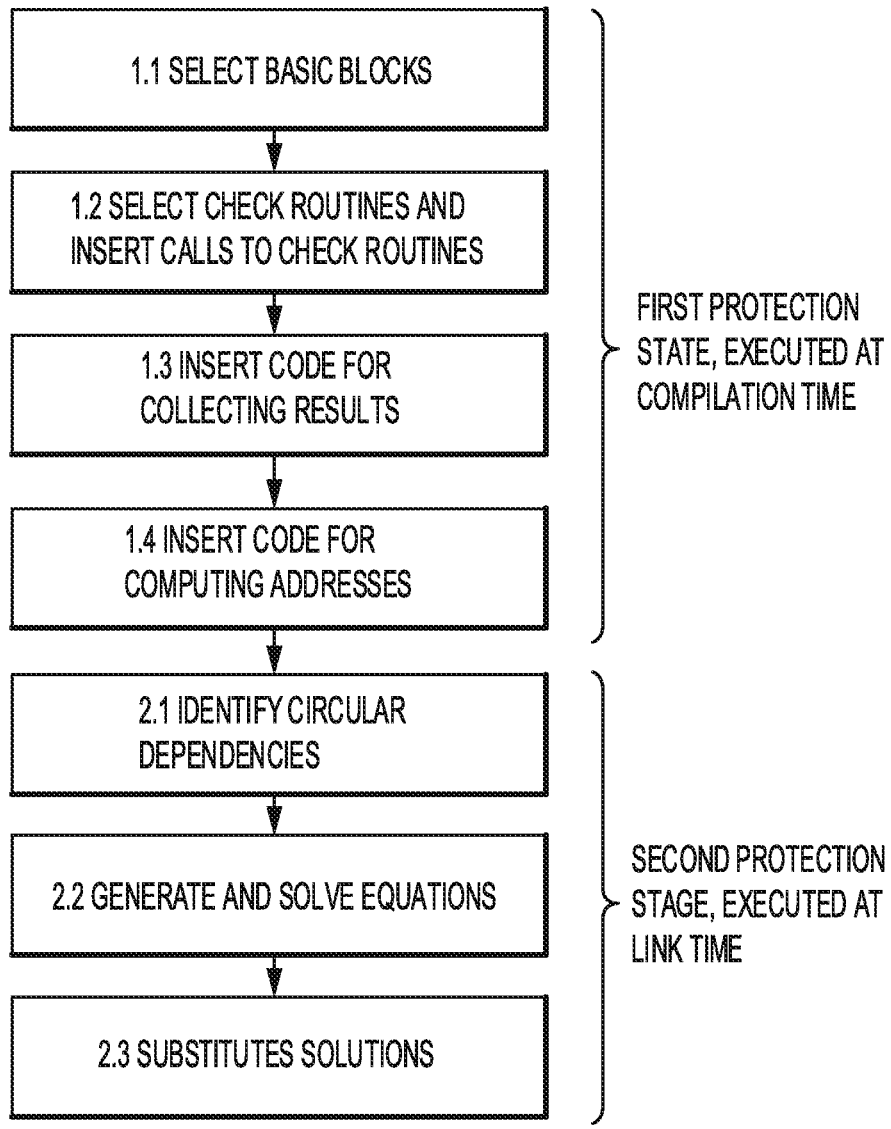
FIG. 6 is a flow diagram of an exemplary process according to various aspects of the disclosure.

The first step of the first protection stage, illustrated as the box labeled 1.1 in FIG. 6, includes selecting for each compilation unit a subset of the set of basic blocks containing at least two elements or the whole set of basic blocks, and this, depending on various conditions. Whether a given basic block is selected or not can depend on, but is not restricted to, one or more of: the number of instructions it contains; the type of instructions it contains; the number of times this basic block is executed at run-time for an average usage of the program; the semantic meaning of the instructions it contains; the time spent by the CPU to execute that basic block; the specific calls to system resources contained in the basic block; the value for a reverse engineer or a hacker of the data handled in that basic block; and the value for a reverse engineer or a hacker of the code executed in that basic block.

For each elected basic block and according to the second step of the first protection stage, illustrated as the box labeled 1.2 in FIG. 6, the disclosed method inserts calls to one or a plurality of check routines, hereafter simply referred to as "checks", at random or pre-defined locations, and according to a pre-defined density. These checks may form a directed dependency graph having one or a plurality of cycles. A check C1 can protect an area of code that contains itself or another check C2. If the check C2 is responsible to protect an area of code memory that contains C1, then a dependency cycle occurs. A dependency cycle may involve at least two different checks. However, the disclosed method can also produce a dependency graph of checks that contain cycles involving more than two checks.

A check C may include a sequence of instructions that can consist of a single or a plurality of basic blocks, whose goal is to compute a pre-defined mathematical function F over a pre-defined area A of memory containing either machine code or data whose integrity is to be protected. The check C returns a result resulting from the function F evaluated over the pre-defined area A. Before the compilation time, a set of check routines are defined that can be freely inserted within the software.

These check functions can differ in several different manners, for instance, but not restricted to the following variants: different checks can implement the same function F, but in a different way, i.e., involving different machine instructions; different checks can implement different functions sharing the same mathematical property, such as, for instance but not restricted to, different linear applications on the same vector space or the same finite field; different checks can cover different size of the portion of code and data memory to be checked; checks can involve or not resources provided by the underlying operating system; checks can involve the usage of different or identical static constants; checks can involve the evaluation of functions defined over different, but mathematically compatible algebraic structures, such as a finite field and an extension thereof, or an identical finite field with different representations; checks can be deterministic or make usage of random data gathered at run-time, as long as the provided result value is deterministically obtained.

The mathematical function F executed by a check routine C can access to the code and data to be protected in different ways, such as, but not restricted to: a sequential read of the memory containing the code and data to be protected by increasing or decreasing addresses; a non-sequential read of the memory containing the code and data to be protected according to pre-defined and deterministic pattern generated by a pseudo-random sequence, said sequence being either hard-coded or re-computed at run-time; the read of only a subset of the memory locations in arbitrary, but pre-defined order, of the memory containing the code and data to be protected; the multiple read of a subset or all memory locations containing the code and data to be protected; a combination of all the above described variants.

If a basic block contains calls to more than a single check, then these checks can be identical or different, and that a given implementation of the check can be used one or several times.

Once the system determines that a check may be embedded at a location in a basic block, the system can choose a check instance following a deterministic or a probabilistic strategy out of a pool of different check implementations.

The function executed by a check routine can access not only to the code and data to be protected, but also to the address value of one or a plurality of memory cells containing the code and data to be protected and/or to the address value of one or a plurality of memory cells containing the code of the basic block in which the check is embedded.

The third step of the first protection stage, illustrated as the box labeled 1.3 in FIG. 6, includes, for each selected basic block, inserting code collecting and storing the value or a plurality of values returned by the check or the plurality of check routines embedded into said basic block. This can be achieved by defining sufficiently many new variables or memory locations whose purpose is to store the value(s) returned by the check(s) embedded into said basic block. The location of these variables or memory locations can be defined either manually, or automatically via the functionalities offered by the compiler.

The fourth step of the first protection stage, illustrated as the box labeled 1.4 in FIG. 6, includes inserting, at the end of each basic block, code computing a further function B responsible to compute the address of the next basic block to be executed, as well as a branching instruction (e.g., a machine instruction able to modify the software control flow), whose goal address is the result of the latter function B applied on all the values produced by the checks contained into said basic block.

The function responsible to compute the address of the next basic block to be executed can have a varying mathematical complexity. For example, the function may include one or more of: a sequence of a plurality of arithmetic operations; of a sequence of a plurality of Boolean operations; a sequence of a plurality of mixed arithmetic and Boolean expressions; a sequence of a plurality of operations implementing what is known in the art of software protection as an opaque construct, i.e., a mathematical expression whose formulation is not easy to understand and to reverse engineer. Furthermore, it can also depend on one or a plurality of constants statically embedded into the function code.

The value provided by function B at run-time and the address of the next basic block to be executed may not be available before the successful termination of the linking process. Therefore, a post-processing stage happening after the linking process may be executed by the disclosed method, whose responsibility is to resolve the expected value produced by each check. This post-processing stage can be made possible by storing the location of the branch instruction responsible to jump into the next basic block to be executed, as well as the nature of the function responsible to compute that address depending on the values produced by the check routines embedded into the said basic black.

This information can be stored, for example, in a dedicated section of the object files produced by the compilation process; in an external file; and/or in a dedicated local or remote database.

The second protection stage of the disclosed method happens at the end of the linking process and is referred to as the post-processing stage. The produced binary executable may not be functional, as some necessary information to compute the program control flow may still be missing after the linking operation. The values returned by each check function F embedded into the various basic blocks, as well as the addresses in which each basic block may jump at the end of its execution may be computed by the functions B. This is the role of the second protection stage in the disclosed method and system.

Figures 4, 5:
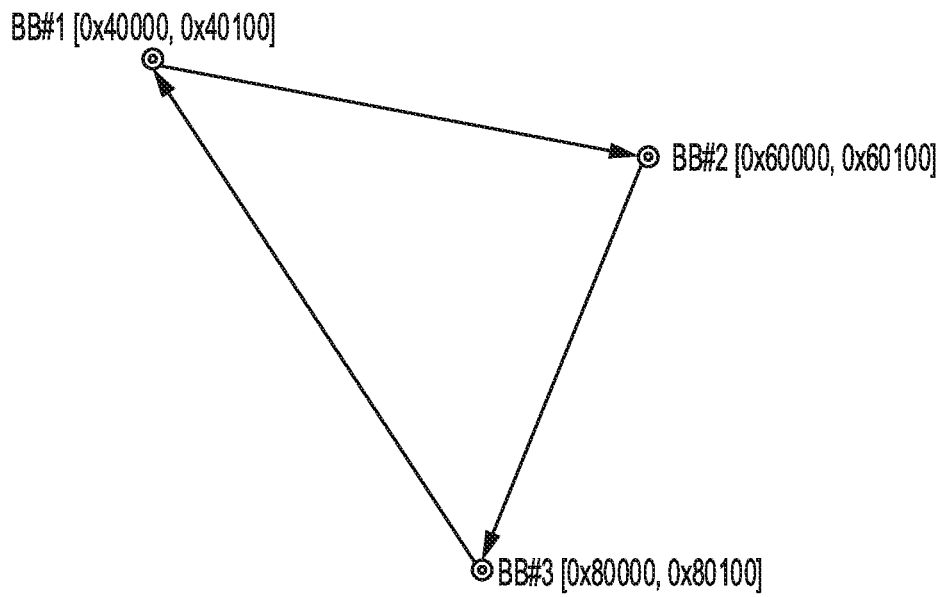
FIG. 4 illustrates three basic blocks presenting circular dependencies between the respective check functions.
FIG. 5 illustrates the directed cyclic graph (DCG) modeling the dependencies of the code of FIG. 4.

Dependency cycles can generate a problem that is similar to an instance of the chicken-and-egg problem: given two inter-dependent checks C1 and C2, i.e., defined such that C1 is checking a portion of memory containing C2 and C2 is checking a portion of memory containing C1, the values and branch targets may be simultaneously resolved, especially when the function responsible to compute the address of the next basic block to be jumped in at the end of a basic block depends on one or a plurality of static constants; or when the checks embedded into a basic block have the addresses or the start address and an offset of the portion of code and data that it is responsible to protect that are statically embedded into the check instructions. Self-checking code presenting cyclic dependencies is illustrated in FIG. 4.

As a consequence, and as illustrated in the box labeled 2.1 in FIG. 6, the first step of the second protection stage includes identifying these circular dependencies and to represent them as a system of mathematical equations involving at least two unknown variables and at least two equations.

These circular dependencies, and consequently the system of equations modeling them, can be solved in several ways, depending on the mathematical nature of the functions F embedded into the check routines and the functions B embedded into the basic blocks. This step is illustrated in the box labeled 2.2 in FIG. 6.

In some embodiments, the functions F embedded into the check routines contained in the basic blocks of the same compilation unit, as well as the functions B responsible to compute the address of the next basic block at the end of each basic block elected to contain checks, are linear mappings defined over a finite field.

A finite field is a mathematical structure consisting of a finite set of elements as well as two different arithmetic operations operating on said elements and enjoying a certain number of well-defined mathematical properties. For example, a finite field is a set $S=\{s0, s1, s2, s3, \ldots, sn\}$ containing n+1 elements equipped with an operation +, often referred to as the field addition, as well as an operation *, often referred to as the field multiplication, enjoying a set of mathematical properties, that include the existence of neutral elements for both operations, the existence of inverse elements for each element with respect to both operations as well as the distributivity of the multiplication with respect to the addition. The system may define finite fields whose set of elements has a cardinality that is a prime number or that is the power of a prime number. An example of a finite field is the set of positive integers (including 0) that are smaller than a prime number p, and the operations are the addition computed modulo p, as well as the multiplication computed modulo p. Another example of a finite field is the set of polynomials of degree smaller than an integer d, whose coefficients are positive integers smaller than a prime number p, where the addition is the standard addition of polynomials with the coefficients being added modulo p and where the multiplication is the multiplication of polynomials modulo an irreducible polynomial of degree d having positive integers smaller than p as coefficients.

A linear mapping defined over a finite field can be interpreted as the multiplication of a vector whose components are elements of the finite field by a matrix whose elements are also elements of the finite field and whose dimensions are compatible with the vector size.

If the functions contained in the checks of a given compilation unit are all linear maps defined over the same finite field, then their interdependence generate a set of linear equations. If that system of linear equations is of full rank, i.e., there is no linear dependency involving two or more equations, the system can efficiently solve the systems of linear equations defined over a finite field using a procedure known as a Gaussian elimination.

In some embodiments, the functions embedded into the check routines contained in the basic blocks of the same compilation unit, as well as the functions responsible to compute the address of the next basic block at the end of each basic block elected to contain checks, are non-linear mappings defined over a finite field.

In the case where the functions embedded into the check routines contained in the basic blocks of the same compilation unit implement non-linear mappings, it may not be possible to solve the induced system of non-linear equations using a Gaussian elimination only. However, for certain shapes of system of non-linear equations defined over certain types of finite fields, it may still be possible to find a solution thereof using efficient techniques, such as linearization and/or brute-forcing the system.

In some embodiments, the functions embedded into the check routines contained in the basic blocks of the same compilation unit, as well as the functions responsible to compute the address of the next basic block at the end of each basic block elected to contain checks, define linear mappings over a finite ring. A finite ring is a mathematical structure consisting of a finite set of elements as well as two different arithmetic operations operating on said elements and enjoying a certain number of well-defined mathematical properties. For example, a finite ring is a set $R=\{r0, r1, r2, r3, \ldots, rn\}$ containing n+1 elements equipped with an operation +, often referred to as the ring addition, as well as an operation *, often referred to as the ring multiplication, enjoying a set of mathematical properties, that include the existence of neutral elements for both operation, the existence of inverse elements for each element with respect to the addition as well as the distributivity of the multiplication with respect to the addition. Note that the existence of an inverse for each element of the set R with respect to the multiplication is not a required property for a finite ring, contrarily to that a finite field.

If the functions F contained in the checks of a given compilation unit are all linear maps defined over the same finite ring, then their interdependence may generate a set of linear equations. This set of linear equations can be solved using a Gaussian elimination, as long as the elements that need to be inverted during that process have all a multiplicative inverse in the ring. In some embodiments, the disclosed system is ultimately responsible to put the checks and to define the inter-dependences between the checks such that the resulting system of linear equation can be inverted.

The third step of the second protection stage, illustrated as the box labeled 2.3 in FIG. 6, includes taking the solutions of the system of equations and embedding these values into the basic blocks.

A malicious modification of the protected binary may result with check functions covering the modified part in a different result value, which in turn will then be used to compute the address of the next basic block to be executed.

Various measures can be implemented in case the address of the next basic block is invalid because of a malicious modification. In some embodiments, the protected software can be made to enter into an infinite loop. The protected software can also be made to call a specific routine that is responsible to take further custom actions.

FIG. 1 represents a two basic blocks, respectively named BB #1 and BB #2. The first basic block BB #1 spans machine code stored in memory between addresses 0x40000 and 0x40100, while the second basic block BB #2 spans machine code stored in memory between addresses 0x80000 and 0x80100. Note that in both basic blocks, all the instructions, but the last one, do not have any influence on the control flow. The last instruction of the first basic block BB #1 is an unconditional jump at the address stored at the address stored in the EBX register. The last instruction of the second basic block BB #2 is an unconditional jump at the address stored at the address stored in the ESI register.

Figure 2:
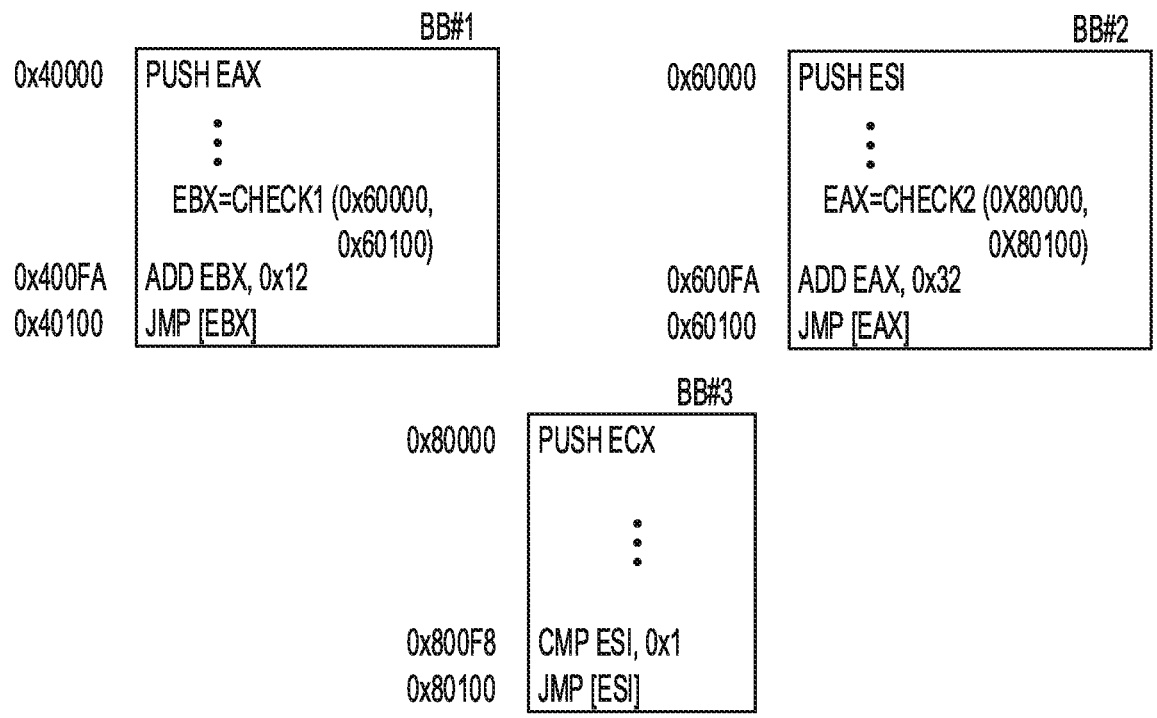
FIG. 2 illustrates three basic blocks with the dependencies between the respective check functions modeled as a directed acyclic graph (DAG)

FIG. 2 represents self-checking code made of three basic blocks, named BB #1, BB #2 and BB #3 whose machine code is stored between the addresses 0x40000 and 0x40100, 0x60000 and 0x60100 as well as 0x80000 and 0x80100, respectively. Two calls to check routines, respectively named check1( ) and check2( ), have been inserted in the basic blocks BB #1 and BB #2, respectively. The result provided by check2( ) is dependent of the code stored between addresses 0x80000 and 0x80100. Hence, the result of check2( ) can be computed in a direct way after the link procedure. The function B2 computing the address of the next basic block to be executed after BB #2 depends on the result of check2( ) and of the static constant 0x32. Knowing the expected result of B2 and the result of check2( ), it is possible to modify the constant 0x32 with the proper value without any ambiguity. The next step consists in repeating the same operation for basic block BB #1. The result provided by check1( ) depends on the code stored between addresses 0x60000 and 0x60100 in a direct way, and indirectly from the code stored between addresses 0x80000 and 0x80100. However, since all values in BB #2 are available or can be computed without any ambiguity, the same process can be repeated for BB #1. In summary, this figure models the fact that the check dependencies form a Directed Acyclic Graph (DAG): check2( ) depends on BB #3 and check1( ) depends on BB #2. In particular, there is no cycle in the dependencies.

Figure 3:
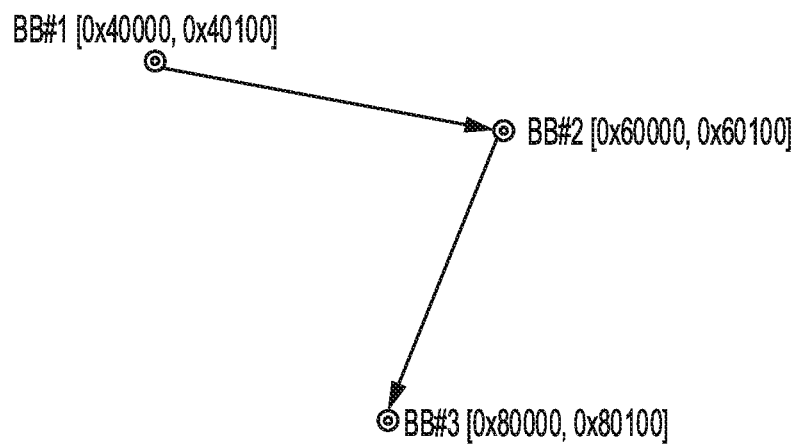
FIG. 3 illustrates a DAG modeling the dependencies of the code of FIG. 2.

FIG. 3 represents the Directed Acyclic Graph (DAG) modeling the scenario of FIG. 2.

FIG. 4 represents self-checking code made of three basic blocks, named BB #1, BB #2 and BB #3 whose machine code is stored between 0x40000 and 0x40100, 0x60000 and 0x60100 as well as 0x80000 and 0x80100, respectively. Three check routines, named check1( ), check2( ) and check3( ), have been inserted in the basic blocks BB #1, BB #2 and BB #3, respectively. The address of the next basic block after BB #1 depends on the return value of check1( ) and the static constant 0x12. The return value of check1( ) depends itself of the code of basic block BB #2, and in particular of the static constant 0x34. The address of the next basic block to be executed after BB #2 depends on the return value of check2( ) and the static constant 0x34. The return value of check2( ) depends itself of the code of basic block BB #3, and in particular of the static constant 0x56. The address of the next basic block after BB #3 depends on the return value of check3( ) and the static constant 0x56. The return value of check3( ) depends itself of the code of basic block BB #1, and in particular of the static constant 0x12. Hence, there is a circular dependency that may be solved simultaneously.

FIG. 5 represents the Directed Cyclic Graph (DCG) modeling the scenario of FIG. 4. FIG. 6 summarizes the two disclosed protection stages, including each step in each stage. The first protection stage is executed at compilation time, while the second protection stage is executed after the link operation.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific IO components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like. The input components 728 may also include one or more image-capturing devices, such as a digital camera for generating digital images or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combinations thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, velocity sensor components (e.g., speedometer), rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 700, such as the system's 700 GPS coordinates or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Changes and modifications may be made to the disclosed embodiments without departing from the scope of the present disclosure. These and other changes or modifications are intended to be included within the scope of the present disclosure, as expressed in the following claims.

What is claimed is:

1. A system comprising:
   a processor; and
   memory coupled to the processor and storing instructions that, when executed by the processor, cause the system to perform operations comprising:
   selecting, for one or more compilation unit of a piece of software, at least two basic blocks from a plurality of basic blocks for the compilation unit, wherein each basic block is located at a respective starting address;
   selecting, for each selected basic block in each of the one or more compilation units, a check routine that returns a check value as a function of an area of memory of the selected basic block;
   inserting, for each selected basic block in each of the one or more compilation units, code into the selected basic block for collecting a result from the selected check routine for the selected basic block; and
   inserting, for each of the one or more compilation units and for each selected basic block, code into the selected basic block to compute a starting address of a next basic block to be executed based on the result collected from the selected check routine.

2. The system of claim 1, wherein selecting the at least two basic blocks, selecting the check routine, inserting the code for collecting the result from the selected check routine, and inserting the code to dynamically compute the starting address are performed at compilation time for the piece of software.

3. The system of claim 1, the operations further comprising:
  identifying, for each of the one or more compilation units, circular dependencies;
  building a system of mathematical equations based on the identified circular dependencies;
  generating solutions for the system of mathematical equations; and
  substituting, for each of the one or more compilation units, the solutions for the system of mathematical equations into the code within the respective selected check routine check for dynamically computing the starting address of the next basic block.

4. The system of claim 3, wherein identifying the circular dependencies, building the system of mathematical equations, generating solutions for the system of mathematical equations, and substituting the solutions for the systems of mathematical equations are performed at link time for the piece of software.

5. The system of claim 1, wherein selecting the least two basic blocks is based on one or more of:
  a number of instruction contained in a basic block, a type of instructions contained in a basic block, a number of times a basic block is executed at run time, a semantic meaning of instructions contained in a basic block, an amount of time required to execute a basic block, and a call to system resources contained in a basic block.

6. The system of claim 1, wherein a location of each call to a check function inserted into the selected basic blocks is one of:
  chosen at random according to a pre-defined density, or a pre-defined location.

7. The system of claim 1, wherein the system selects, and inserts calls to, a plurality of check routines, and wherein different check routines in the plurality of check routines verify one or more of:
  areas of memory of different size, and overlapping areas of memory.

8. The system of claim 1, wherein the check routine gathers random data at run time.

9. The system of claim 1, wherein the check routine read a memory area to be checked according to an order defined by a pseudo-random sequence.

10. The system of claim 1, wherein the check routine reads at least one location of a memory area to be checked multiple times.

11. The system of claim 1, wherein the check routine reads only a subset of the memory locations in a memory area to be checked.

12. The system of claim 1, wherein a function within the check routine includes a linear mapping defined over a finite field.

13. The system of claim 1, wherein a function within the check routine includes non-linear mappings defined over a finite field.

14. The system of claim 1, wherein a function within the check routine includes linear mappings defined over a finite ring.

15. The system of claim 1, wherein the code for dynamically computing the starting address of the next basic block includes an opaque construct.

16. The system of claim 1, wherein the software enters into an infinite loop in response to the check routine detecting tampering.

17. The system of claim 1, wherein the check routine calls a pre-defined routine in response to detecting tampering.

18. The system of claim 1, wherein a directed graph presenting at least one cycle is generated by the system based on an inserted call to the selected check routine, and wherein generating the directed graph includes:
  a first call to the check routine inserted into a first basic block and producing a first check value based on an area of a second basic block; and
  a second call to the check routine inserted into said the second basic block and producing a second check value based on an area of a next basic block, wherein the next basic block is either another basic block or the first basic block, and wherein a dependency cycle is defined in the directed graph in response to the next basic block being the first basic block.

19. A method comprising:
  selecting, for one or more compilation units of a piece of software, at least two basic blocks from a plurality of basic blocks for the compilation unit, wherein each basic block is located at a respective starting address;
  selecting, for each selected basic block in each of the one or more compilation units, a check routine that returns a check value as a function of an area of memory of the selected basic block;
  inserting, for each selected basic block in each of the one or more compilation units, code into the selected basic block for collecting a result from the selected check routine for the selected basic block; and
  inserting, for each of the one or more compilation units and for each selected basic block, code into the selected basic block to compute a starting address of a next basic block to be executed based on the result collected from the selected check routine.

20. A non-transitory computer-readable medium storing instructions that, when executed by a computer system, cause the computer system to perform operations comprising:
  selecting, for one or more compilation units of a piece of software, at least two basic blocks from a plurality of basic blocks for the compilation unit, wherein each basic block is located at a respective starting address;
  selecting, for each selected basic block in each of the one or more compilation units, a check routine that returns a check value as a function of an area of memory of the selected basic block;
  inserting, for each selected basic block in each of the one or more compilation units, code into the selected basic block for collecting a result from the selected check routine for the selected basic block; and
  inserting, for each of the one or more compilation units and for each selected basic block, code into the selected basic block to compute a starting address of a next basic block to be executed based on the result collected from the selected check routine.

* * * * *